(12) United States Patent
Kano

(10) Patent No.: US 9,019,430 B2
(45) Date of Patent: Apr. 28, 2015

(54) IMAGE PICKUP APPARATUS HAVING TRIPOD BASE

(71) Applicant: Canon Kabushiki Kaisha, Tokyo (JP)

(72) Inventor: Takahiko Kano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 13/863,850

(22) Filed: Apr. 16, 2013

(65) Prior Publication Data

US 2013/0286270 A1    Oct. 31, 2013

(30) Foreign Application Priority Data

Apr. 27, 2012  (JP) ................ 2012-102872

(51) Int. Cl.
  *H04N 5/225*   (2006.01)
  *G03B 17/00*   (2006.01)
  *G03B 17/02*   (2006.01)

(52) U.S. Cl.
  CPC ........... *H04N 5/2253* (2013.01); *H04N 5/2251* (2013.01); *H04N 5/2252* (2013.01)

(58) Field of Classification Search
  CPC ............... H04N 5/2251–5/2252; G03B 17/02; G03B 17/561
  USPC ............. 348/333.01, 373–376; 396/374, 424, 396/535, 541
  See application file for complete search history.

(56) References Cited

U.S. PATENT DOCUMENTS

| 8,289,720 | B2 * | 10/2012 | Ishikawa | 361/749 |
| 2005/0057685 | A1 * | 3/2005 | Yamaguchi | 348/375 |
| 2010/0013986 | A1 * | 1/2010 | Yamamoto | 348/375 |
| 2011/0019079 | A1 * | 1/2011 | Saiki | 348/375 |
| 2012/0155037 | A1 * | 6/2012 | Yamamoto | 361/749 |

FOREIGN PATENT DOCUMENTS

JP   2010-243878 A   10/2010

* cited by examiner

*Primary Examiner* — Daniel M Pasiewicz
(74) *Attorney, Agent, or Firm* — Cowan, Liebowitz & Latman, P.C.

(57) ABSTRACT

An image pickup apparatus which is capable of protecting a flexible wiring plate during assembly of the image pickup apparatus, thus improving the ease of assembly and realizing cost reduction due to a decrease in the number of components. A cover member has an opening exposing an image display surface of the display which has a folded flexible wiring plate and covers the rear side of the image pickup apparatus main body. A tripod base member is disposed on a bottom and has an abutting portion and a guide portion. A folded portion of the flexible wiring plate comes into abutment with the abutting portion and covered with the tripod base member. The guide portion guides a leading end portion of the cover member on mounted on the image pickup apparatus main body, and hence the leading end portion of the cover member does not contact with the folded portion.

5 Claims, 7 Drawing Sheets

IMAGE PICKUP APPARATUS HAVING TRIPOD BASE

BACKGROUND OF THE INVENTION

1. Field of the Invention

The present invention relates to an image pickup apparatus having a display and a tripod base.

2. Description of the Related Art

In general, a display unit such as a liquid crystal panel for a user to see a taken image is provided on a rear side of an image pickup apparatus such as a digital camera.

A flexible wiring plate is extended from the display unit, and there is known a technique that in order to protect the flexible wiring plate, the display unit is placed on a frame wrapping the flexible wiring plate (see Japanese Laid-Open Patent Publication (Kokai) No. 2010-243878).

In recent years, however, as price competition on the market has grown severe as for image pickup apparatuses, cost reduction by decreasing the number of parts for an image pickup apparatus is urgently necessary. Accordingly, protecting the flexible wiring plate without using a member such as a frame that protects the flexile wiring plate is desired.

SUMMARY OF THE INVENTION

The present invention provides an image pickup apparatus capable of protecting a flexible wiring plate during assembly of an image pickup apparatus, thus improving the ease of assembly for the image pickup apparatus and realizing cost reduction due to a decrease in the number of parts.

Accordingly, a first aspect of the present invention provides an image pickup apparatus comprising a display configured to have a flexible wiring plate and be disposed on a rear side of an image pickup apparatus main body with the flexible wiring plate being folded, a cover member configured to have an opening that exposes an image display surface of the display and cover the rear side of the image pickup apparatus main body, and a tripod base member configured to be disposed on a bottom side of the image pickup apparatus main body, wherein an abutting portion and a guide portion are formed on the tripod base member, wherein a folded portion of the flexible wiring plate comes into abutment with the abutting portion when the tripod base member is mounted on the image pickup apparatus main body, the folded portion of the flexible wiring plate being covered with the tripod base member, and wherein the guide portion guides a leading end portion of the cover member when the cover member is mounted on the image pickup apparatus main body on which the tripod base has been mounted so that the leading end portion of the cover member does not contact with the folded portion of the flexible wiring plate.

According to the present invention, because a flexible wiring plate can be protected using the tripod base during assembly of the image pickup apparatus to improve the ease of assembly for the image pickup apparatus and realize cost reduction due to a decrease in the number of parts.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof. Here, a digital camera is taken as an example of an image pickup apparatus. The present invention, however, is not limited to this, but may be applied to an arbitrary image pickup apparatus (such as a digital video camera) or the like.

Figure 1:
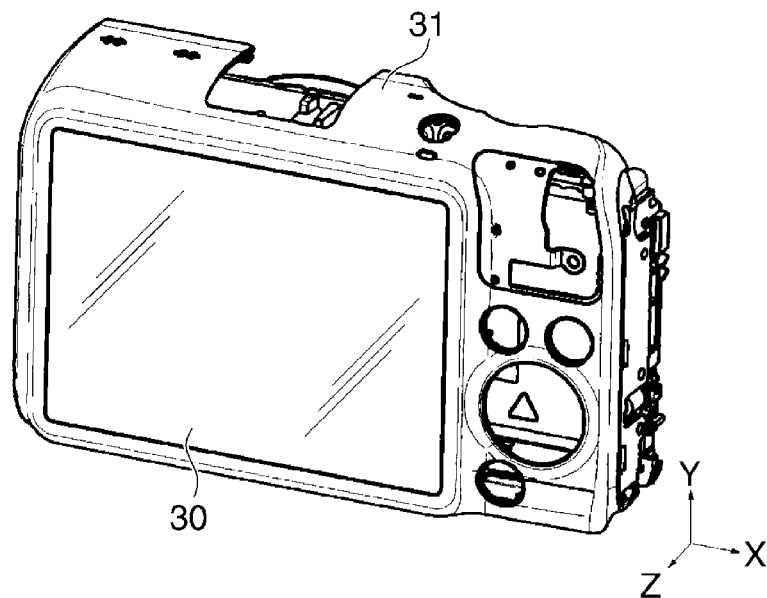
FIG. 1 is a rear view showing an image pickup apparatus according to an embodiment of the present invention, in which a display and its peripheral components are selectively shown.

The image pickup apparatus according to the present embodiment has a construction in which an image pickup lens unit is disposed on a front side, a display that displays an image is disposed on a rear side, and a tripod base to which a tripod is to be attached is disposed on a bottom side. FIG. 1 is a perspective view showing the image pickup apparatus according to the present embodiment as viewed from the rear side, in which the display and its peripheral components are selectively shown.

A three-dimensional perpendicular coordinate system (X, Y, and Z) appearing in FIG. 1 is common to FIGS. 2 to 11 as well. In the following description, a Z direction side is defined as "the rear side" of the image pickup apparatus, and a side opposed to this is defined as "the front side" of the image pickup apparatus. An X direction side is defined as "the right side" of the image pickup apparatus, and a side opposed to this is defined as "the left side" of the image pickup apparatus. A Y direction side is defined as "the upper side" of the image pickup apparatus, and a side opposed to this is defined as "the bottom side" of the image pickup apparatus.

A rear cover 31 constituting the image pickup apparatus is provided with an opening from which an image display surface of the display 30 is to be exposed, and the display 30 is fitted in this opening. It should be noted that the rear cover 31 is made of, for example, metal.

Figure 2:
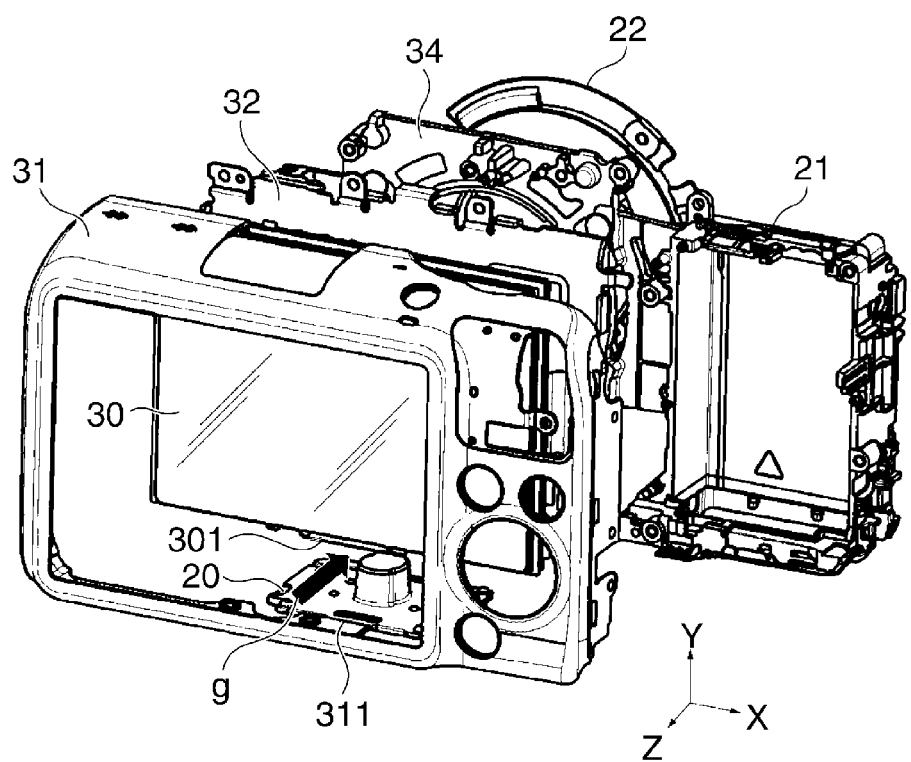
FIG. 2 is an exploded perspective view showing constructions of a display and its peripheral components appearing in FIG. 1.

FIG. 2 is an exploded perspective view showing constructions of the display 30 and its peripheral components appearing in FIG. 1. The display 30 is held on a back plate 32, which is attached to a front base 34. On the right side of the image pickup apparatus, a battery box 21 capable of holding a battery therein is placed in a manner being fastened to the front base 34. On the front side of the image pickup apparatus, an MIF (mount interface) base 22 which is electrically connected to the image pickup lens unit and fastened to the front base 34 is placed. It should be noted that both the battery box 21 and the MIF base 22 are exemplary interior members of the image pickup apparatus. On the bottom side of the image pickup apparatus, the tripod base 20 having a tripod screw portion for fastening a tripod to the image pickup apparatus is placed.

An arrow g shown in FIG. 2 indicates a mounting direction in which the rear cover 31 is mounted onto an image pickup apparatus main body. It should be noted that in the following description, component elements of "the image pickup apparatus main body" are the front base 34, the battery box 21, the MIF base 22, the back plate 32, and the display 30. A leading end portion 311 is formed in a part of the rear cover 31 which corresponds to the bottom side of the image pickup apparatus. Thus, during mounting of the rear cover 31, the leading end portion 311 is a leading end of the rear cover 31 on the bottom side. The rear cover 31 is formed through press working on a metal material such as aluminum and stainless, and accordingly, the leading end portion 311 of the rear cover 31 has a form of a sharp edge.

Figure 3A:
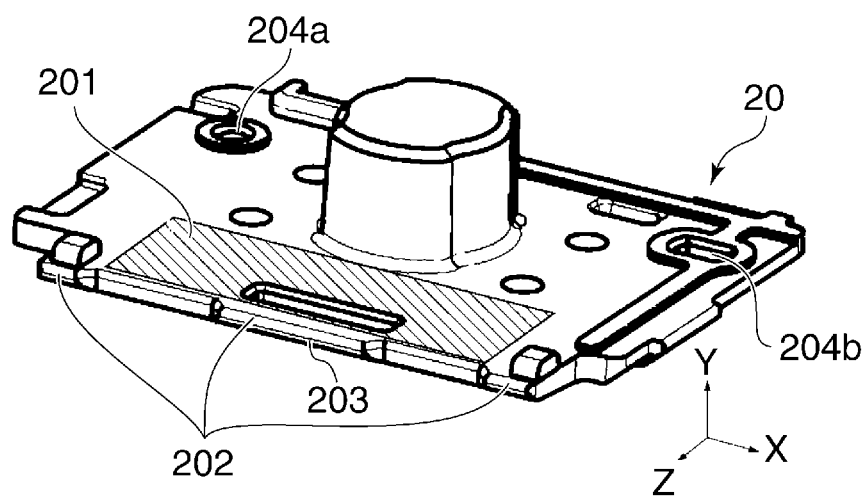
FIGS. 3A and 3B are perspective views showing a construction of a tripod base appearing in FIG. 2.
Figure 3B:
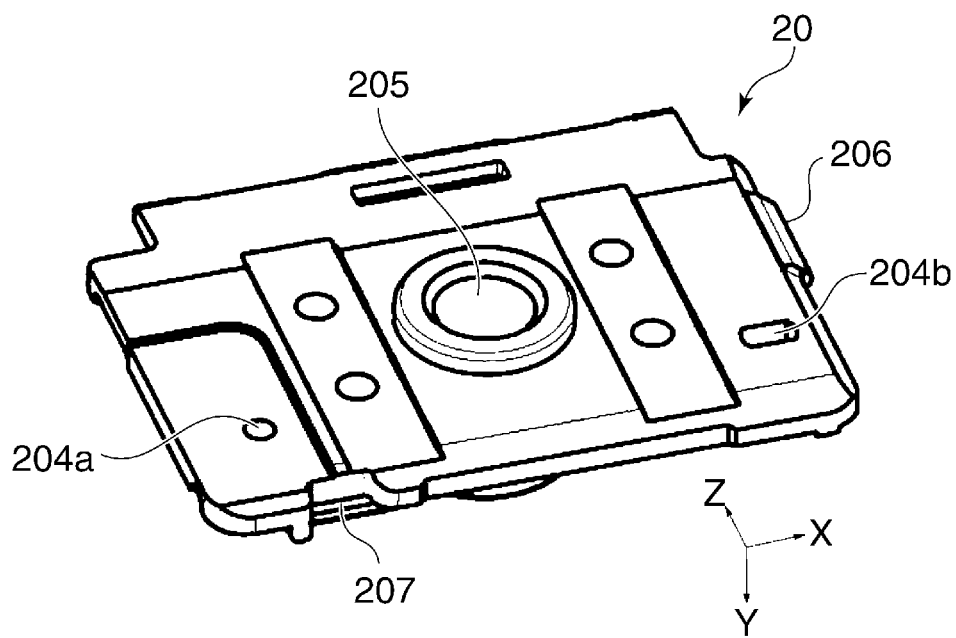

FIGS. 3A and 3B are perspective views showing in detail a construction of the tripod base 20, in which FIG. 3A is a perspective view showing the tripod base 20 as viewed from the upper side, and FIG. 3B is a perspective view showing the tripod base 20 as viewed from the bottom side.

As shown in FIG. 3A, a flat portion 201 as an abutting portion is formed in a part of an upper surface of the tripod base 20 which corresponds to the rear side of the image pickup apparatus. It should be noted that in the tripod base 20, the flat portion 201 is formed by extending a side of the image pickup apparatus on the rear side further toward the rear side of the image pickup apparatus. As will be described later, the flat portion 201 has such a breadth as to support a part of a flexible wiring plate 301 (herein after, referred to as an FPC-LCD 301) mounted on the display 30, the part which projects to the bottom side of the image pickup apparatus.

The tripod base 20 has a drawing portion 203 formed on a bottom side of a leading end 202 of the side extending to the rear side, and positioning holes 204a and 204b for positioning the tripod base 20 on the front base 34. As shown in FIG. 3B, a tripod screw portion 205 in which a female screw thread on which a tripod is to be mounted is cut is formed in the tripod base 20. Further, two tripod base-side engaging portions are formed in the tripod base 20. One of the two tripod base-side engaging portions is a tripod base engaging convex portion 206 having a convex shape, and the other one of the two tripod base-side engaging portions is a tripod base engaging concave portion 207 having a concave shape. When the tripod base 20 is mounted on the image pickup apparatus main body, the tripod base engaging convex portion 206 is positioned on the right side of the image pickup apparatus and the tripod base engaging concave portion 207 is positioned on the left side of a front surface of the image pickup apparatus.

Figure 4:
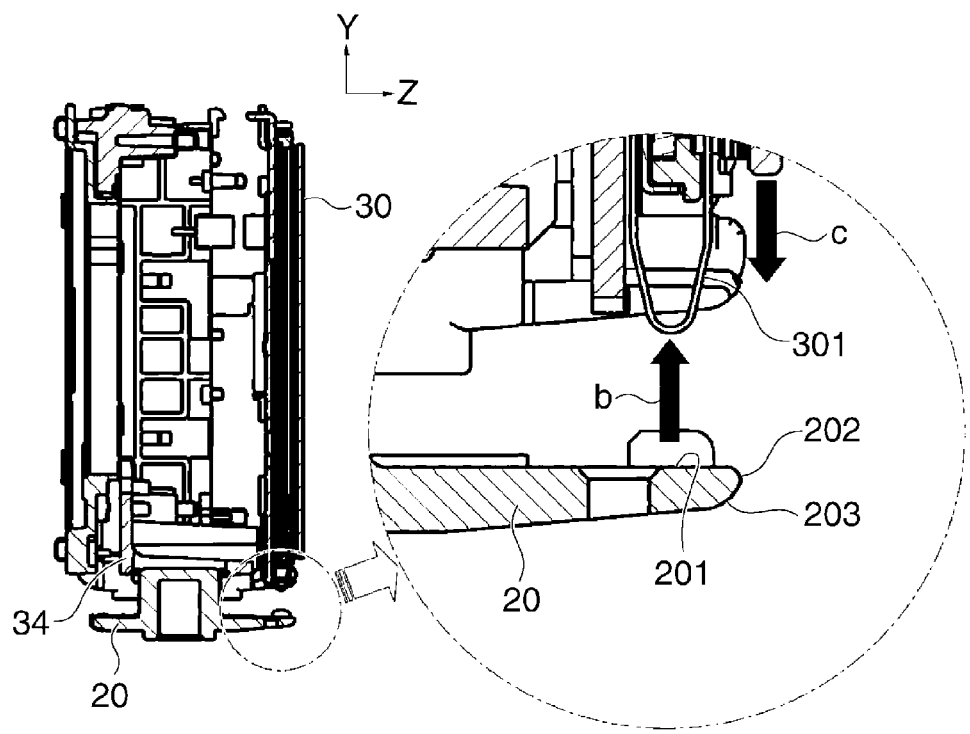
FIG. 4 is a cross-sectional view showing the tripod base cut in the center in a state immediately before the tripod base appearing in FIG. 2 is mounted on an image pickup apparatus main body.
Figure 5:
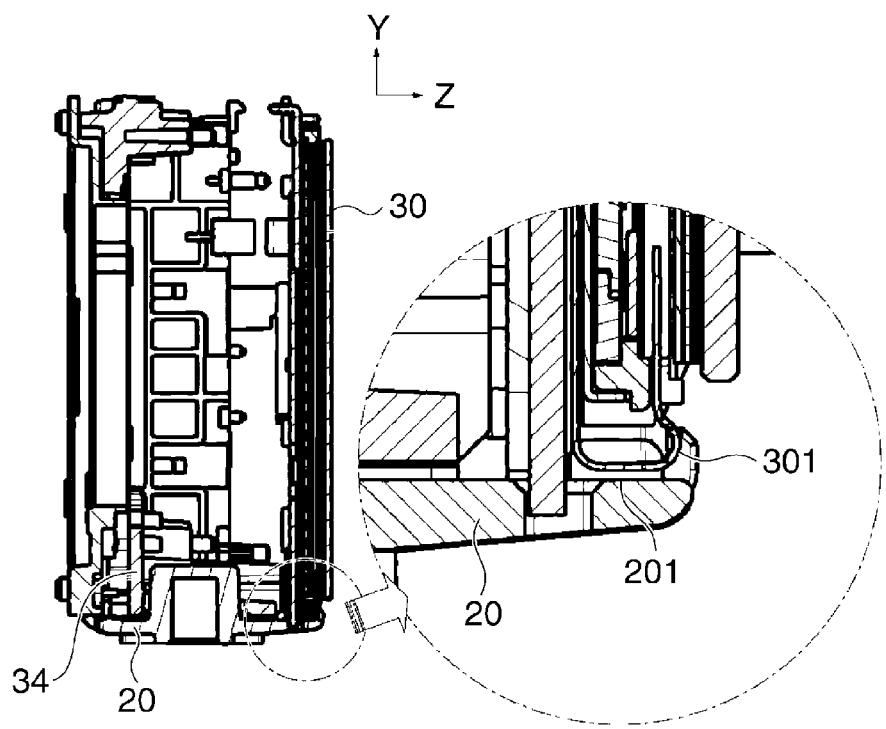
FIG. 5 is a cross-sectional view showing the tripod base cut in the center in a state immediately after the tripod base appearing in FIG. 2 is mounted on the image pickup apparatus main body.

Referring now to FIGS. 4 and 5, a description will be given of the positional relationship between the tripod base 20 and the FPC-LCD 301 during assembly of the image pickup apparatus. It should be noted that a detailed description will be given later of how the tripod base 20 is mounted on the image pickup apparatus main body.

FIG. 4 is a cross-sectional view showing the tripod base 20 cut in the center in a state immediately before the tripod base 20 is mounted on the image pickup apparatus main body. It should be noted that at a stage prior to the state shown in FIG. 4, the battery box 21, the MIF base 22, and the back plate 32 are fastened to the front base 34 by screws (not shown), and the display 30 is held by a holding portion (not shown) of the back plate 32.

The tripod base 20 is mounted on the image pickup apparatus main body in a direction indicated by an arrow b in FIG. 4 from the bottom side to the upper side of the image pickup apparatus main body. At this time, a folded portion of the FPC-LCD 301 projects from the bottom side of the image pickup apparatus main body in a direction indicated by an arrow c. Thus, the positional relationship between the tripod base 20 and the FPC-LCD 301 in the Z direction is such that the flat portion 201 and the folded portion of the FPC-LCD 301 are opposed to each other in the Y direction, and the direction in which the tripod base 20 is mounted and the direction in which the folded portion of the FPC-LCD 301 projects are substantially parallel to each other.

FIG. 5 is a cross-sectional view showing the tripod base 20 cut in the center in a state immediately after the tripod base 20 is mounted on the image pickup apparatus main body and showing a state immediately after the tripod base 20 in the state shown in FIG. 4 is mounted in the Y direction onto the image pickup apparatus main body. In the process in which the tripod base 20 is mounted, the flat portion 201 as the abutting portion is brought into abutment with the folded portion of the FPC-LCD 301, the folded portion of the FPC-LCD 301 is covered with the tripod base 20, and as a result, the folded portion of the FPC-LCD 301 is deformed along the plane portion 201.

At this time, the folded portion of the FPC-LCD 301 is deformed along the flat portion 201 in the direction opposite to the projecting direction, and hence the FPC-LCD 301 is not damaged when the tripod base 20 is mounted on the image pickup apparatus main body. Moreover, with the tripod base 20 mounted on the image pickup device main body as shown in FIG. 5, the folded portion of the FPC-LCD 301 is covered with the flat portion 201 as viewed from the Y direction, and as a result, the folded portion of the FPC-LCD 301 becomes not to project from the image pickup device main body.

Therefore, according to the present embodiment, as a result of mounting the tripod base 20 on the image pickup apparatus main body, the folded portion of the FPC-LCD 301, which projects from the bottom side of the image pickup apparatus main body, becomes not to project from the bottom side of the image pickup apparatus main body and becomes to be covered with the tripod base 20.

In the assembly process for the image pickup apparatus according to the present embodiment, the tripod base 20 is held by the battery box 21 and the MIF base 22 which are interior members constituting the image pickup apparatus main body. A detailed description thereof will now be given with reference to FIGS. 6 to 9.

Figure 6:
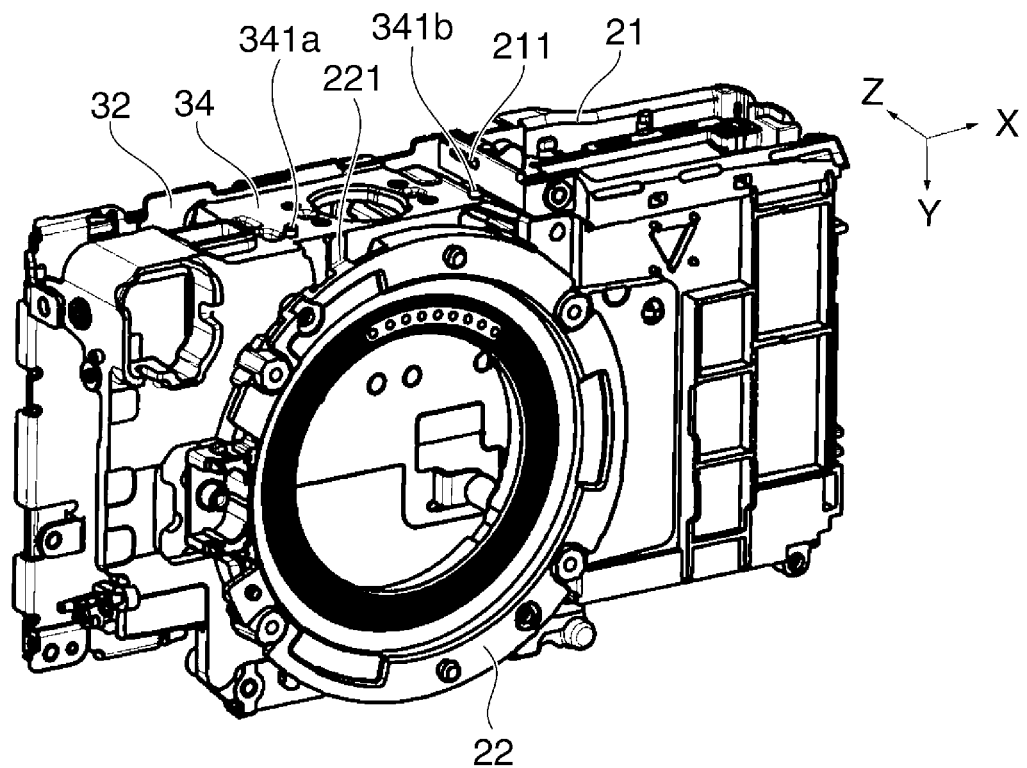
FIG. 6 is a perspective view showing a state before the tripod base appearing in FIG. 2 is mounted on the image pickup apparatus main body.

FIG. 6 is a perspective view showing the image pickup apparatus main body before the tripod base 20 is mounted on the image pickup apparatus main body, and in FIG. 6, the image pickup apparatus main body is drawn with the bottom side thereof facing up. The image pickup apparatus main body is constructed such that the battery box 21, the MIF base 22, and the back plate 32 are fastened to the front base 34, and the display 30 is held by the back plate 32.

A battery box engaging convex portion 211, which is one of main body-side engaging portions, is formed in the battery box 21, and an MIF engaging hook 221, which is another main-body side engaging portion and has an elastically-deformable hook shape, is formed in the MIF base 22. The front base 34 is provided with positioning bosses 341a and 341b for positioning the tripod base 20.

Figure 7:
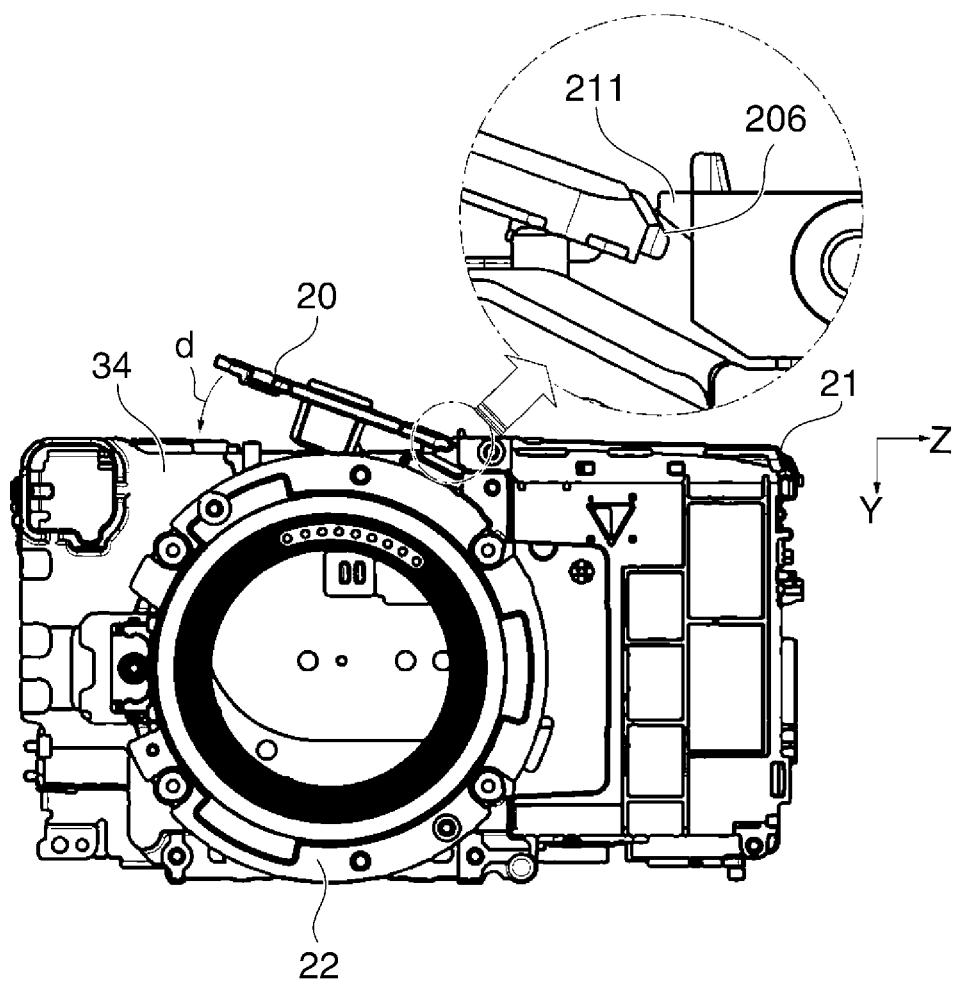
FIG. 7 is a front view showing a state in which mounting of the tripod base appearing in FIG. 2 on the image pickup apparatus main body is started.

FIG. 7 is a front view showing a state in which mounting of the tripod base 20 on the image pickup apparatus main body appearing in FIG. 6 is started. When the tripod base 20 is to be mounted on the image pickup apparatus main body, first, the tripod base 20 is tilted with respect to a bottom surface of the image pickup apparatus main body as shown in FIG. 7, and the tripod base engaging convex portion 206 is slid into a space under the battery box engaging convex portion 211 (in the Y direction). Then, the tripod base 20 is rotated in a direction indicated by an arrow d in FIG. 7 about the tripod base engaging convex portion 206.

Figure 8:
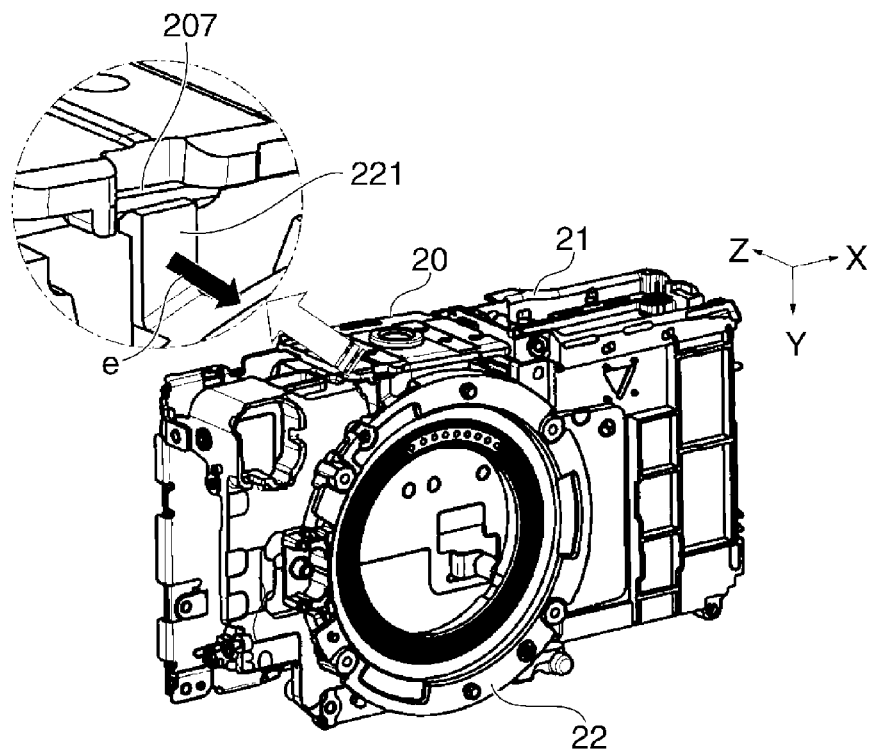
FIG. 8 is a perspective view showing a state in which the tripod base appearing in FIG. 2 is being mounted on the image pickup apparatus main body.

FIG. 8 is a perspective view showing a state in which the tripod base 20 is being mounted onto the image pickup apparatus main body and after the tripod base 20 is rotated in the direction indicated by the arrow d in FIG. 7. The tripod base engaging convex portion 206 and the tripod base engaging concave portion 207 are disposed substantially point-symmetrical with respect to the tripod screw portion 205. As the tripod base 20 is rotated in the direction indicated by the arrow d in FIG. 7, the tripod base engaging concave portion 207 and the MIF engaging hook 221 of the MIF base 22 come into abutment with each other as shown in FIG. 8. Then, due to a force from the tripod base engaging concave portion 207, the MIF engaging hook 221 elastically becomes deformed (bends) in a direction indicated by an arrow e in FIG. 8 (a direction substantially perpendicular to the direction in which the tripod base 20 is mounted) so as to draw away from the tripod base 20. As a result, the tripod base 20 can be further rotated (pressed into the image pickup apparatus main body) in the direction indicated by the arrow d in FIG. 7.

In this stage, the positioning holes 204a and 204b for the tripod base 20 are engaged with the positioning bosses 341a and 341b of the front base 34, and as a result, positions of the tripod base 20 with respect to the image pickup apparatus main body in the X direction and the Z direction are fixed. Also, at this stage, the flat portion 201 of the tripod base 20 deforms the folded portion of the FPC-LCD 301 along the flat portion 201 while bending the same in the direction (the direction Y) opposite to the projecting direction.

In the present embodiment, the tripod base 20 is rotated about the tripod base engaging convex portion 206, but when the flat portion 201 comes into abutment with the folded portion of the FPC-LCD 301, the direction in which the tripod base 20 moves (the mounting direction) becomes substantially parallel to the direction Y. Thus, the flat portion 201 and the projecting direction of the folded portion become substantially perpendicular to each other, and hence no stress is put on the folded portion of the FPC-LCD 301 in directions other than the projecting direction. Accordingly, the folded portion of the FPC-LCD 301 can be pushed up in the Y direction while being safely bent.

Figure 9:
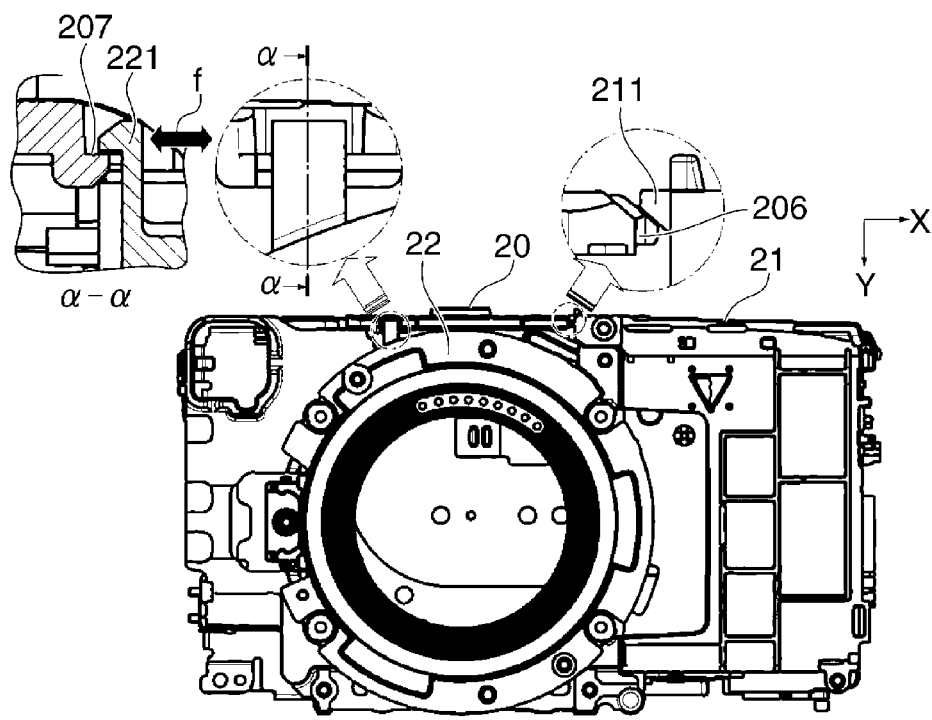
FIG. 9 is a perspective view showing a state in which the tripod base appearing in FIG. 2 is held by the image pickup apparatus main body.

FIG. 9 is a front view showing a state in which the tripod base 20 is held by the image pickup apparatus main body. When the tripod base 20 is further rotated in the state shown in FIG. 8, the tripod base engaging convex portion 206 slides into a space under the battery box engaging convex portion 211 as viewed in the figure (in the direction Y) as shown in an enlarged view on the right-hand side of FIG. 9. As a result, even when the tripod base 20 is about to drop off in a direction opposite to the Y direction (toward the bottom side of the image pickup apparatus), the tripod base engaging convex portion 206 comes into contact with the battery box engaging convex portion 211, and hence the tripod base 20 can be prevented from dropping off.

An enlarged view in the center of FIG. 9 shows an area where the tripod base engaging concave portion 207 and the MIF engaging hook 221 are in engagement with each other, and an enlarged view on the left-hand side of FIG. 9 is a cross-sectional view of the central enlarged view taken along line α-α. An arrow f in the enlarged view on the left-hand side of FIG. 9 indicates the direction in which the MIF engaging hook 221 elastically becomes deformed. When the tripod base 20 has moved to a holding completion position in the Y direction, the MIF engaging hook 221 comes back from the retracting position at which it has elastically been deformed to the original position and engages with the tripod base engaging concave portion 207.

Thus, movement of the tripod base 20 in the Y direction is restrained by the battery box engaging convex portion 211 and the MIF engaging hook 221. Moreover, movement of the tripod base 20 in the direction X and the direction Z is restrained by engagement between the positioning holes 204a and 204b and the positioning bosses 341a and 341b provided in the front base 34. As a result, the tripod base 20 is positioned on and held by the image pickup apparatus main body in all the X, Y, and Z directions, and the tripod base 20 is prevented from dropping off toward the bottom side of the image pickup apparatus. In the present embodiment, the tripod base 20 can be held in a balanced manner because the plurality of engaging portions that hold the tripod base 20 are disposed substantially point-symmetrically with respect to the center of gravity of the tripod base 20 (in the tripod base 20, near the center of the tripod screw portion 205).

Figure 10:
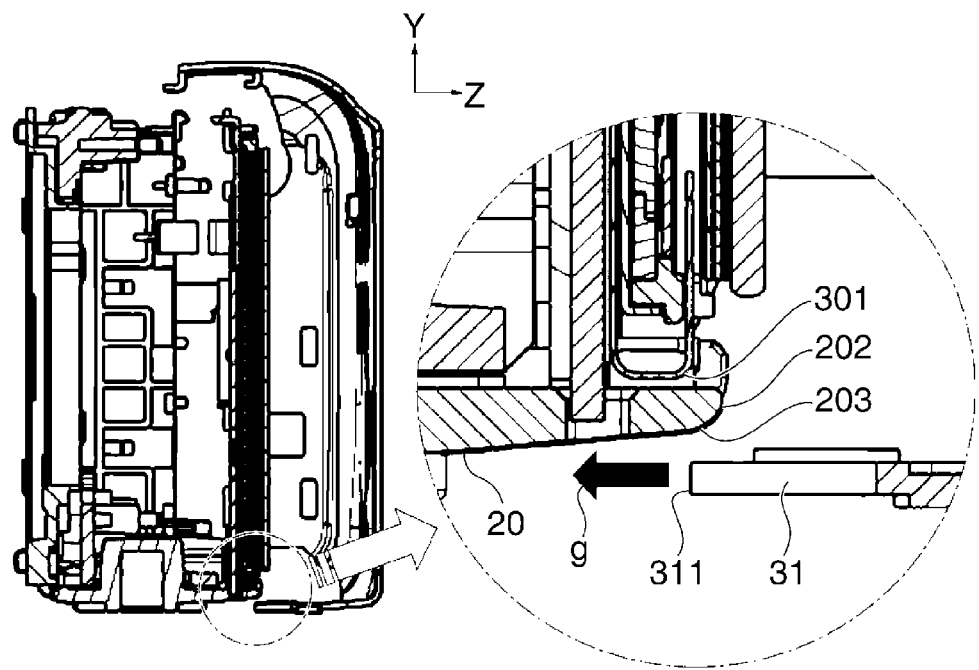
FIG. 10 is a cross-sectional view showing how a rear cover is mounted on the image pickup apparatus main body by which the tripod base appearing in FIG. 2 is held and showing a state before the rear cover is mounted onto the image pickup apparatus main body.
Figure 11:
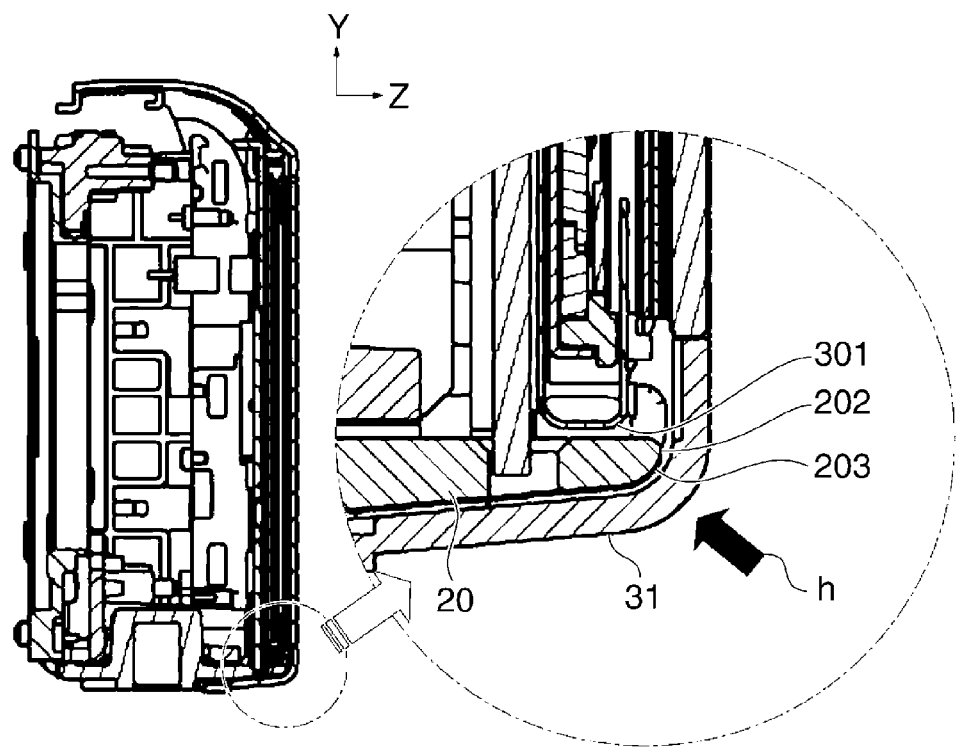
FIG. 11 is a cross-sectional view showing how the rear cover is mounted on the image pickup apparatus main body by which the tripod base appearing in FIG. 2 is held and showing a state after the rear cover is mounted onto the image pickup apparatus main body.

FIGS. 10 and 11 are cross-sectional views showing how the rear cover 31 is mounted onto the image pickup apparatus main body with the tripod base 20 held thereby thereto and showing a Y-Z plane which passes through substantially the center of the tripod screw portion 205 as viewed from the left side of the image pickup apparatus.

FIG. 10 shows a state before the rear cover 31 is mounted onto the image pickup apparatus main body. As shown in a detail view on the right-hand side of FIG. (a view showing the flat portion 201 of the tripod base 20 and its vicinity on the rear side of the image pickup apparatus), the folded portion of the FPC-LCD 301 lies along the flat portion 201 of the tripod base 20 in a state where the tripod base 20 is held by the image pickup apparatus main body. The rear cover 31 is mounted onto the image pickup apparatus main body in a direction indicated by an arrow g in FIG. 10, and on this occasion, the leading end portion 311 of the rear cover 31 is a leading end of the rear cover 31 on the bottom side during mounting. As described above, the rear cover 31 is formed through press working on a metal material, and accordingly, the leading end portion 311 of the rear cover 31 has the form of the sharp edge.

In the present embodiment, because the folded portion of the FPC-LCD 301 is covered with the flat portion 201 of the tripod base 20 when the rear cover 31 is mounted on the image pickup apparatus main body, the leading end portion 311 of the rear cover 31 never damages the FPC-LCD 301. Moreover, because the leading end portion 202 of the tripod base 20 is provided with the drawing portion 203 as a guide portion, the leading end portion 311 is guided in abutment with the drawing portion 203 as the guide portion to cover the flat portion 201 from the bottom side of the image pickup apparatus main body even if the mounting position varies in the Y direction when the rear cover 31 is mounted. In this way, the rear cover 31 can be easily mounted at a predetermined position of the image pickup apparatus main body. Thus, according to the present embodiment, the rear cover 31 can be easily and reliably mounted on the image pickup apparatus main body without damaging the FPC-LCD 301.

FIG. 11 shows a state after the rear cover 31 is mounted on the image pickup apparatus main body. As shown in FIG. 11, defining the tripod base 20 as a boundary, the folded portion of the FPC-LCD 301 is placed on the upper side of the tripod base 20, and the rear cover 31 is placed on the bottom side of the tripod base 20. As shown in FIG. 11, in the state of being fixed to the image pickup apparatus main body, the tripod base 20 has such a shape that the leading end portion 202 lies along an inner wall of the rear cover 31.

Therefore, for example, when a force is applied to the rear cover 31 in a direction indicated by an arrow h in FIG. 11 due to a drop of the image pickup apparatus or the like, the tripod base 20 sustains the inner wall of the rear cover 31, and hence the rear cover 31 can be prevented from being deformed inwardly. Moreover, the tripod base 20 covers the FPC-LCD 301, the FPC-LCD 301 can be prevented from being damaged.

As described above, according to the present embodiment, in the process of assembly for the image pickup apparatus, the positioning bosses 341a and 341b of the front base 34 and the positioning holes 204a and 204b of the tripod base 20 are engaged with each other. Moreover, the tripod base engaging convex portion 206 provided in the tripod base 20 is engaged with the battery box engaging convex portion 211 of the battery box 21, and the tripod base engaging concave portion 207 provided in the tripod base 20 is engaged with the MIF engaging hook 221 of the MIF base 22. As a result, the tripod base 20 can be held at a predetermined position without using screws or the like until the rear cover 31 is mounted onto the image pickup apparatus main body.

Moreover, in the process of assembly for the image pickup apparatus, the folded portion of the FPC-LCD 301 is covered with the flat portion 201 of the tripod base 20, and hence when the rear cover 31 is mounted onto the image pickup apparatus main body, the folded portion of the FPC-LCD 301 never comes into contact with the rear cover 31. Further, after the image pickup apparatus is assembled, the leading end portion 202 of the tripod base 20 which is an area where the flat portion 201 is formed receives external force acting on the rear cover 31, and hence external force is unlikely to act on the folded portion of the FPC-LCD 301. As a result, during and after assembly of the image pickup apparatus, the folded portion of the FPC-LCD 301 can be reliably protected.

As described above, according to the present embodiment, the ease of assembly for the image pickup apparatus can be improved, and also, during assembly or after assembly, the folded portion of the FPC-LCD 301 can be reliably protected. Moreover, because a dedicated member for protecting the folded portion of the FPC-LCD 301 can be dispensed with, cost reduction can be realized.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-102872 filed Apr. 27, 2012, which is hereby incorporated by reference herein in its entirety.

What is claimed is:

1. An image pickup apparatus comprising:
a display configured to have a flexible wiring plate and be disposed on a rear side of an image pickup apparatus main body with the flexible wiring plate being folded;
a cover member configured to have an opening that exposes an image display surface of said display and cover the rear side of the image pickup apparatus main body; and
a tripod base member configured to be disposed on a bottom side of the image pickup apparatus main body,
wherein an abutting portion and a guide portion are formed on said tripod base member,
wherein a folded portion of the flexible wiring plate comes into abutment with the abutting portion when said tripod base member is mounted on the image pickup apparatus main body, the folded portion of the flexible wiring plate being covered with said tripod base member, and
wherein the guide portion guides a leading end portion of said cover member when said cover member is mounted on the image pickup apparatus main body on which said tripod base has been mounted so that the leading end portion of said cover member does not contact with the folded portion of the flexible wiring plate.

2. An image pickup apparatus according to claim 1, wherein the folded portion of the flexible wiring plate projects from the image pickup apparatus main body before said tripod base member is mounted on the image pickup apparatus main body, and the folded portion of the flexible wiring plate becomes deformed so that the folded portion lies along the abutting portion after said tripod base member is mounted on the image pickup apparatus main body.

3. An image pickup apparatus according to claim 1, wherein a plurality of engaging portions which are to be engaged with the image pickup apparatus main body when said tripod base member is mounted on the image pickup apparatus main body are formed in said tripod base member, and
wherein said tripod base member is held by the image pickup apparatus main body by engaging the plurality of engaging potions with the image pickup apparatus main body.

4. An image pickup apparatus according to claim 3, wherein the plurality of engaging portions are disposed point-symmetrically with respect to a center of gravity of said tripod base member.

5. An image pickup apparatus according to claim 3, wherein one of the plurality of engaging portions is engaged with the image pickup apparatus man body and said tripod base member is rotated about the engaged one engaging portion, so that the other of the plurality of engaging portions is engaged with the image pickup apparatus main body, and
wherein a direction in which said tripod base member moves in a case where the other of the plurality of engaging portions is engaged with the image pickup apparatus main body is opposite to a direction in which the folded portion of the flexible wiring plate projects from the image pickup apparatus main body.

\* \* \* \* \*